(12) United States Patent
Zhang et al.

(10) Patent No.: US 11,873,704 B2
(45) Date of Patent: Jan. 16, 2024

(54) CONNECTION DEVICE, CONTROL BOX COMPONENT AND FRACTURING APPARATUS

(71) Applicant: YANTAI JEREH PETROLEUM EQUIPMENT & TECHNOLOGIES CO., LTD., Shandong (CN)

(72) Inventors: Peng Zhang, Shandong (CN); Rikui Zhang, Shandong (CN); Liang Lv, Shandong (CN); Xiaolei Ji, Shandong (CN); Chunqiang Lan, Shandong (CN); Yipeng Wu, Shandong (CN); Xincheng Li, Shandong (CN); Yuxuan Sun, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/691,632

(22) Filed: Mar. 10, 2022

(65) Prior Publication Data

US 2022/0235642 A1 Jul. 28, 2022

Related U.S. Application Data

(63) Continuation-in-part of application No. 17/398,375, filed on Aug. 10, 2021, now Pat. No. 11,668,173,
(Continued)

(30) Foreign Application Priority Data

Jan. 26, 2021 (CN) .......................... 202110101567.8
Sep. 10, 2021 (CN) .......................... 202122186195.1

(51) Int. Cl.
*E21B 43/26* (2006.01)
*E21B 35/00* (2006.01)
(Continued)

(52) U.S. Cl.
CPC .......... *E21B 43/2607* (2020.05); *E21B 35/00* (2013.01); *E21B 43/26* (2013.01);
(Continued)

(58) Field of Classification Search
CPC ........................... E21B 43/26; E21B 43/2607
See application file for complete search history.

(56) References Cited

U.S. PATENT DOCUMENTS 10,227,854 B2 * 3/2019 Glass .................. E21B 43/2607
10,407,990 B2 9/2019 Oehring et al.
(Continued)

FOREIGN PATENT DOCUMENTS

CN 102602323 A 7/2012
CN 207752603 U 8/2018
(Continued)

*Primary Examiner* — Shane Bomar
(74) *Attorney, Agent, or Firm* — Crowell & Moring LLP (57) ABSTRACT

A connection device, a control box component, and a fracturing apparatus are provided. The connection device includes: a fixation rack, configured to be fixedly connected with a mounting base; a box connection mechanism, configured to be connected with the control box, and drive the control box to move at least from a first position to a second position relative to the fixation rack. In a case that the control box is located at the first position, the control box is located at a side of the transmission component and a distance between the control box and the transmission component is less than a predetermined distance, and during the control box being moved from the first position to the second position, the control box is away from the transmission component to form an operation space for the transmission component at the first position.

20 Claims, 6 Drawing Sheets

Related U.S. Application Data which is a continuation of application No. 17/172,819, filed on Feb. 10, 2021, now Pat. No. 11,143,006.

(51) Int. Cl.

| | |
|---|---|
| *F02C 7/06* | (2006.01) |
| *F02C 7/24* | (2006.01) |
| *F02C 7/32* | (2006.01) |
| *A62C 35/00* | (2006.01) |
| *F01M 1/00* | (2006.01) |
| *F01M 5/00* | (2006.01) |
| *F16N 7/00* | (2006.01) |

(52) U.S. Cl.
CPC ................ *F02C 7/06* (2013.01); *F02C 7/24* (2013.01); *F02C 7/32* (2013.01); *A62C 35/00* (2013.01); *F01M 1/00* (2013.01); *F01M 5/002* (2013.01); *F05D 2260/98* (2013.01); *F16N 7/00* (2013.01)

(56) References Cited

U.S. PATENT DOCUMENTS

| | | | |
|---|---|---|---|
| 10,865,624 B1 | 12/2020 | Cui et al. | |
| 10,865,631 B1 | 12/2020 | Zhang et al. | |
| 10,954,855 B1 | 3/2021 | Ji et al. | |
| 10,961,993 B1 | 3/2021 | Ji et al. | |
| 11,125,066 B1* | 9/2021 | Yeung | F02C 7/32 |
| 11,384,629 B2* | 7/2022 | Reddy | F04B 49/06 |
| 2014/0048268 A1 | 2/2014 | Chandler | |
| 2017/0030177 A1* | 2/2017 | Oehring | E21B 7/02 |
| 2017/0292513 A1* | 10/2017 | Haddad | F04B 49/065 |
| 2018/0266412 A1 | 9/2018 | Stokkevåg et al. | |
| 2018/0363640 A1* | 12/2018 | Kajita | G05B 19/042 |
| 2020/0206651 A1 | 7/2020 | Frick | |
| 2020/0332784 A1 | 10/2020 | Zhang et al. | |
| 2020/0400005 A1 | 12/2020 | Han et al. | |
| 2021/0071579 A1 | 3/2021 | Li et al. | |
| 2021/0086851 A1 | 3/2021 | Zhang et al. | |
| 2021/0087883 A1 | 3/2021 | Zhang et al. | |
| 2021/0087916 A1 | 3/2021 | Zhang et al. | |
| 2021/0088042 A1 | 3/2021 | Zhang et al. | |
| 2022/0410172 A1* | 12/2022 | Mitchell | B03B 5/04 |
| 2023/0139271 A1* | 5/2023 | Crowe | F01D 15/08 |
| | | | 417/53 |

FOREIGN PATENT DOCUMENTS

| | | |
|---|---|---|
| CN | 109882144 A | 6/2019 |
| CN | 110005085 A | 7/2019 |
| CN | 110469654 A | 11/2019 |
| CN | 110485983 A | 11/2019 |
| CN | 112780245 A | 5/2021 |

\* cited by examiner

CONNECTION DEVICE, CONTROL BOX COMPONENT AND FRACTURING APPARATUS

CROSS REFERENCE TO RELATED APPLICATIONS

This application is a continuation in part of U.S. Ser. No. 17/398,375 filed on Aug. 10, 2021 which is a continuation application of U.S. Ser. No. 17/172,819 filed on Feb. 10, 2021. The application U.S. Ser. No. 17/172,819 claims priority of Chinese Patent Application CN 202110101567.8, filed on Jan. 26, 2021. This application also claims priority under 35 U.S.C. 119 from the Chinese Patent Application CN 202122186195.1, filed on Sep. 10, 2021. The disclosures of all of these applications hereby incorporated herein by reference in their entirety.

TECHNICAL FIELD

Embodiments of the present disclosure relate to a connection device, a control box component, and a fracturing apparatus.

BACKGROUND

Recently, as the demand for unconventional natural gas, such as shale gas, has grown, the demand for fracturing apparatus has also substantially grown. The fracturing apparatus usually includes a power device, a transmission component and a control box, etc. In some fracturing apparatus, the transmission component and the control box are close to each other in position, and it is difficult for the maintenance operation of the transmission component.

SUMMARY

The present disclosure relates to a connection device, a control box component, and a fracturing apparatus. In some example implementations, a connection device for connecting a control box of a fracturing apparatus with a mounting base of the fracturing apparatus is disclosed. The fracturing apparatus may include a transmission component. The transmission component may include a transmission shaft. The connection device may include a fixation rack, configured to be fixedly connected with the mounting base; a box connection mechanism, configured to be connected with the control box, and drive the control box to move at least from a first position to a second position relative to the fixation rack. When the connection device is connected with the mounting base and the control box is located at the first position, the control box may be located at a side of the transmission component in a direction perpendicular to an axis of the transmission shaft and a distance between the control box and the transmission component may be less than a predetermined distance. uring the control box being moved from the first position to the second position, the control box may be away from the transmission component to form an operation space for the transmission component at the first position.

In the implementation above, the box connection mechanism may be configured to drive the control box to rotate at least between the first position and the second position. The control box may have a first surface, and in a case that the control box is located at the first position, the first surface may face the transmission component. During the control box being moved from the first position to the second position, an included angle between the first surface and the axis of the transmission shaft may increase gradually.

In any of the implementations above, the box connection mechanism may be configured to drive the control box to move at least between the first position and the second position. The control box may have a first surface, and in a case that the control box is located at the first position, the first surface may face the transmission component. During the control box being moved from the first position to the second position, a distance between the first surface and the axis of the transmission shaft may increase gradually.

In any of the implementations above, the fixation rack may include a first fixation bracket and a second fixation bracket, each of which is configured to have a first end fixedly connected with the mounting base and a second end extending in a first direction relative to the first end; and a fixation shaft, configured to have a first end fixedly connected with the first fixation bracket and a second end extending in a second direction relative to the first end, and the fixation shaft is rotatably connected with the box connection mechanism. When the connection device is connected with the mounting base, any two of the first direction, the second direction and the axis of the transmission shaft may be perpendicular to each other.

In any of the implementations above, the box connection mechanism may include a support fame, comprising a bottom frame and a vertical frame fixedly connected with the bottom frame, wherein a plane where the bottom frame is located is parallel with a plane formed by the first direction and the axis of the transmission shaft. When the box connection mechanism is located at the first position, two sides of the bottom frame may lap on the first fixation bracket and the second fixation bracket, respectively. The vertical frame may be located at a side of the bottom frame away from the first fixation bracket and the second fixation bracket, and the vertical frame may be configured to be connected with the control box. The box connection mechanism may further include a rotation shaft configured to have a first end fixedly connected with the support frame and a second end extending to the second direction relative to the first end. The rotation shaft may be rotatably connected with the fixation shaft.

In any of the implementations above, the control box may include a first control box and a second control box, and the first control box and the second control box may be connected with two sides of the vertical fame, respectively. The support frame may further include a first vertical rod and a second vertical rod connected with the two sides of the vertical frame. The first vertical rod may be configured to be connected with the first control box, and the second vertical rod may be configured to be connected with the second control box.

In any of the implementations above, the fixation shaft may be located at the second end of the first fixed bracket.

In any of the implementations above, the connection device may further include a first limitation component, which may include a first limitation structure and a second limitation structure, wherein the first limitation structure is disposed on the support frame, the second limitation structure is disposed on the second fixation bracket, and the first limitation structure and the second limitation structure cooperate with each other to lock the control box at the first position.

In any of the implementations above, the connection device my further include a second limitation component, which my include a third limitation structure and a fourth limitation structure, wherein the third limitation structure is disposed on the support frame, the fourth limitation structure is disposed on the first fixation bracket, and the third limitation structure and the fourth limitation structure cooperate with each other to lock the control box at the second position.

In any of the implementations above, the connection device my further include at least one shock absorber, configured to be connected between the support frame and the control box. The at least one shock absorber may include a first shock absorber and a second shock absorber, the first shock absorber is configured to be connected between the first vertical rod and the first control box and/or between the second vertical rod and the second control box. The second shock absorber may be configured to be connected between the bottom frame and the control box. The shock absorber may include a vibration isolator.

In any of the implementations above, a surface of the first fixation bracket towards the second direction may be provided with a first pad plate. The first pad plate may be configured to be lapped with the support frame. The first pad plate may extend in the first direction. A thickness of a side of the first pad plate facing the second fixation bracket may be less than a thickness of a side of the first pad plate away from the second fixation bracket, to form a first inclined surface on the first pad plate.

In any of the implementations above, a surface of the second fixation bracket towards the second direction may be provided with a second pad plate. The second pad plate may be configured to be lapped with the support frame. The second pad plate may extend in the first direction. A thickness of a side of the first pad plate close to the first end of the second fixation bracket may be larger than a thickness of a side of the second pad plate close to the second end of the second fixation bracket, to form a second inclined surface on the second pad plate.

In any of the implementations above, the first fixation bracket may be provided with a via hole running through the first fixation bracket in a direction of the axis of the transmission shaft, for a cable running through the via hole to be connected with the control box.

In some other implementations, a control box component is disclosed. The control box component may include a control box, and the connection device any of the implementations above. The control box may be connected to the connection device.

In the implementations above, the fixation rack may include a first fixation bracket and a second fixation bracket, each of which may be configured to have a first end fixedly connected with the mounting base and a second end extending in a first direction relative to the first end. The fixation rack may further include a fixation shaft, configured to have a first end fixedly connected with the first fixation bracket and a second end extending in a second direction relative to the first end, and the fixation shaft is rotatably connected with the box connection mechanism. When the connection device is connected with the mounting base, any two of the first direction, the second direction and the axis of the transmission shaft may be perpendicular to each other.

In any of the implementations above, the box connection mechanism may include a support fame, which may include a bottom frame and a vertical frame fixedly connected with the bottom frame, wherein a plane where the bottom frame is located is parallel with a plane formed by the first direction and the axis of the transmission shaft. When the box connection mechanism is located at the first position, two sides of the bottom frame may lap on the first fixation bracket and the second fixation bracket, respectively. The vertical frame may be located at a side of the bottom frame away from the first fixation bracket and the second fixation bracket, and the vertical frame may be configured to be connected with the control box. The box connection mechanism may further include a rotation shaft, configured to have a first end fixedly connected with the support frame and a second end extending to the second direction relative to the first end, and the rotation shaft being rotatably connected with the fixation shaft.

In any of the implementations above, the control box may include a first control box and a second control box, and the first control box and the second control box are connected with two sides of the vertical fame, respectively. The support frame may further include a first vertical rod and a second vertical rod connected with the two sides of the vertical frame. The first vertical rod may be configured to be connected with the first control box, and the second rod maybe configured to be connected with the second control box.

In some other implementations, a fracturing apparatus is disclosed. The fracturing apparatus may include a mounting base, a transmission component, a control box, and the connection device of any of the implementations above. The control box may be connected to the mounting base through the connection device.

In any of the implementations above, the box connection mechanism may be configured to drive the control box to rotate at least between the first position and the second position. The control box may have a first surface, and when the control box is located at the first position, the first surface may face the transmission component. During the control box being moved from the first position to the second position, an included angle between the first surface and the axis of the transmission shaft may increase gradually.

In any of the implementations above, the box connection mechanism may be configured to drive the control box to move at least between the first position and the second position. The control box may have a first surface, and when the control box is located at the first position, the first surface may face the transmission component. During the control box being moved from the first position to the second position, a distance between the first surface and the axis of the transmission shaft may increase gradually.

BRIEF DESCRIPTION OF THE DRAWINGS

In order to clearly illustrate the technical solution of embodiments of the present disclosure, the drawings of the embodiments will be briefly described in the following. It is obvious that the drawings in the description are only related to some embodiments of the present disclosure and not limited to the present disclosure.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, the technical terminology or scientific terminology used herein should have the general meanings understood by those skills in the art to which the present invention belongs. The "first", "second" and similar words used in the present invention application specification and claims do not mean any sequence, amount or importance, but are merely used to distinguish different components. Likewise, "a" or "an" or similar words do not mean the limitation to amount, instead, it refers to at least one. The word "comprise", "include" or the like only indicates that an element or a component before the word contains elements or components listed after the word and equivalents thereof, not excluding other elements or components. "Connecting" or "connected" and similar words are not limited to the physical or mechanical connection, but may comprise electrical connection, no matter directly or indirectly. The words "on", "beneath", "left", "right" and the like only indicate the relative position relationship which is correspondingly changed when the absolute position of a described object is changed.

Figure 1:
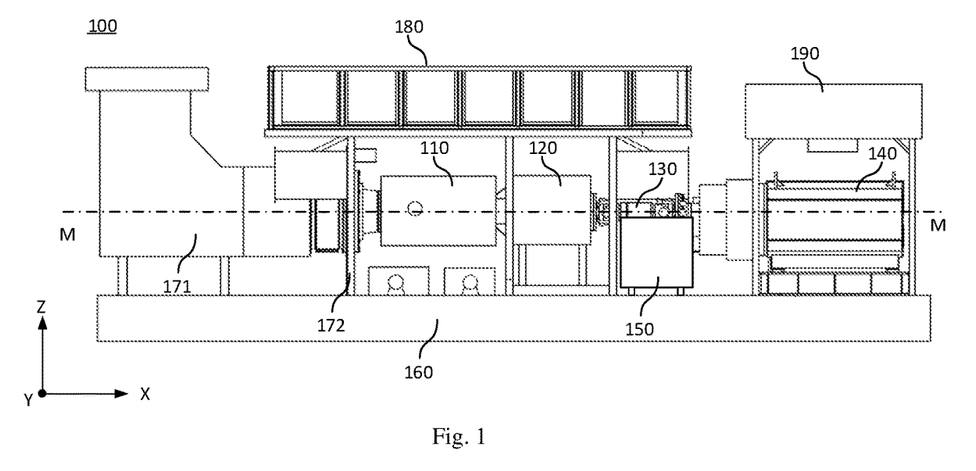
FIG. 1 illustrates a schematic structural diagram of a fracturing apparatus.

FIG. 1 illustrates a schematic structure diagram of a fracturing apparatus. As illustrated in FIG. 1, the fracturing apparatus 100 includes a power device 100, a reducer 120, a transmission shaft 130 and a plunger pump 140 which are connected in sequence. The power device 10 can adopt a turbine engine, the reducer 120 can function to match rotational speed, etc., and the transmission shaft can transfer power of the reducer 120 to the plunger pump, to drive the plunger pump to operate. The transmission shaft 130 can include a coupling, and the coupling can connect an output shaft of the reducer with an input shaft of the plunger pump. A peripheral of the transmission shaft 130 can be provided with a transmission shaft protection mask (not illustrated), the transmission shaft protection mask encloses at least a partial region of the transmission shaft. For example, the transmission shaft protection mask can enclose the transmission shaft 130 by 360 degrees. Alternatively, the transmission shaft protection mask can cover merely two sides of the transmission shaft 130. The transmission shaft protection mask can have a shape of circle, arc, square, polygon, etc., and the shape and dimension of the transmission shaft protection mask can be designed under actual requirements, which is not limited in the embodiments of the disclosure. The transmission shaft protection can protect the transmission shaft 130 and isolate the transmission shaft 130 operated in high speed from an operator and other objects.

For example, the fracturing apparatus 130 can further includes a control box 150, electrical control elements (for example, a controller, etc.) can be provided in the control box 150, the electrical control elements can be connected with a plurality of kinds of sensors provided on the fracturing apparatus to acquire a plurality of kinds of sensed data, and can further control and adjust corresponding devices of the fracturing apparatus 100 based on the sensed data. The plurality of kinds of the sensors can include a temperature sensor, a smoke sensor, etc., for example.

For example, the control box 150 and the transmission shaft protection mask are close to each other in position, and the transmission shaft protection mask is shielded, which cause difficulty for the maintenance of the transmission shaft protection mask or the transmission shaft.

At least one embodiment of the present disclosure provides a connection device, a control box component and a fracturing apparatus. The connection device is configured to connect a control box of a fracturing apparatus with a mounting base of the fracturing apparatus. The fracturing apparatus further includes a transmission component, and the transmission component includes a transmission shaft. The connection device includes: a fixation rack, configured to be fixedly connected with the mounting base; a box connection mechanism, configured to be connected with the control box and drive the control box to move at least from a first position to a second position relative to the fixation rack. In a case that the connection device is connected with the mounting base and the control box is located at the first position, the control box is located at a side of the transmission component in a direction perpendicular to an axis of the transmission shaft, and a distance between the control box and the transmission component is less than a predetermined distance. During the control box being moved from the first position to the second position, the control box is moved away from the transmission component, to form an operation space for the transmission component at the first position. In a state of the fracturing apparatus in a normal operation, the connection device can make the control box located at the first position, so that the respective parts of the fracturing apparatus can be more compact. In a case that the transmission component is required to be maintained, the control box can be moved to the second position, so that a region is empty as an operation space at a side of the transmission component, which is convenient for an operator to maintain the transmission component in the operation space.

Figure 2:
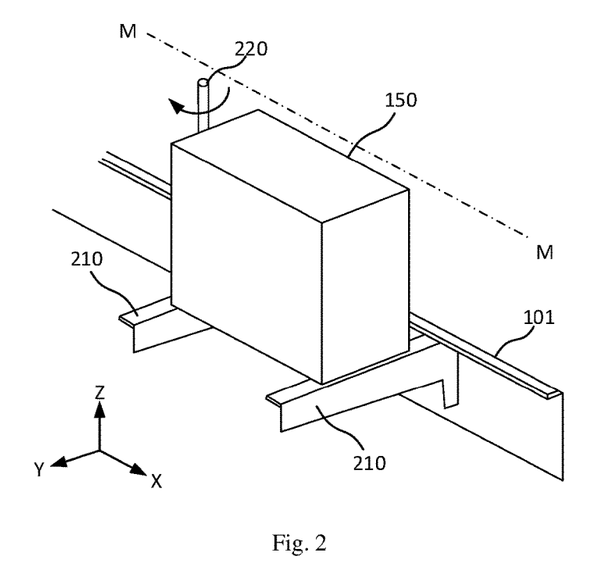
FIG. 2 illustrates a schematic diagram of a connection between a connection device and a control box according to at least one embodiment of the present disclosure.

FIG. 2 illustrates a schematic diagram of a connection between the connection device and the control box according to at least one embodiment of the present disclosure.

As illustrated in FIGS. 1 and 2, the connection device is configured to connect the control box 150 of the fracturing apparatus with the mounting base 101 of the fracturing apparatus. The fracturing apparatus further includes a transmission component, and the transmission component includes the transmission shaft 130. In addition, the transmission component can further include a transmission shaft protection mask.

For example, the connection device can include a fixation rack 210 and a box connection mechanism 220 connected with the fixation rack 210. The fixation rack 210 is configured to be fixedly connected with the mounting base 101. The box connection mechanism 220 is configured to be connected with the control box 150 and drive the control box 150 to move at least from a first position to a second position relative to the fixation rack 210. In a case that the connection device is connected with the mounting base 101 and the control box 150 is located at the first position, the control box 150 is located at a side of the transmission component in a direction perpendicular to an axis M-M of the transmission shaft 130 (i.e. a direction perpendicular to direction X) and a distance between the control box 150 and the transmission shaft is less than a predetermined distance. During the box connection mechanism 220 being moved from the first position to the second position, the control box 150 is moved away from the transmission component, to form an operation space for the transmission component at the first position.

For example, the control box as illustrated in FIG. 2 is located at the first position. In this state, the control box 150 and the transmission component are arranged in the direction Y. That is, the control box 150 is located at a side of the transmission component in the direction Y, and the direction Y is perpendicular to the direction of the axis M-M of the transmission shaft 130 (the direction X). The distance between the control box 150 and the transmission shaft (for example, a distance between the control box 150 and the transmission shaft protection mask) is less a predetermined distance. That is, the distance between the control box 150 and the transmission component is relatively small. For example, the predetermined distance can be in a range from 0.1 m (meter) to 0.5 m (meter), which can be determined under actual requirements and is not limited by the embodiments of the disclosure. This arrangement can make the respective parts of the fracturing apparatus more compact and occupy less space. However, the control box 150 may shield the transmission component, which is not convenient to maintain the transmission component.

Figure 3:
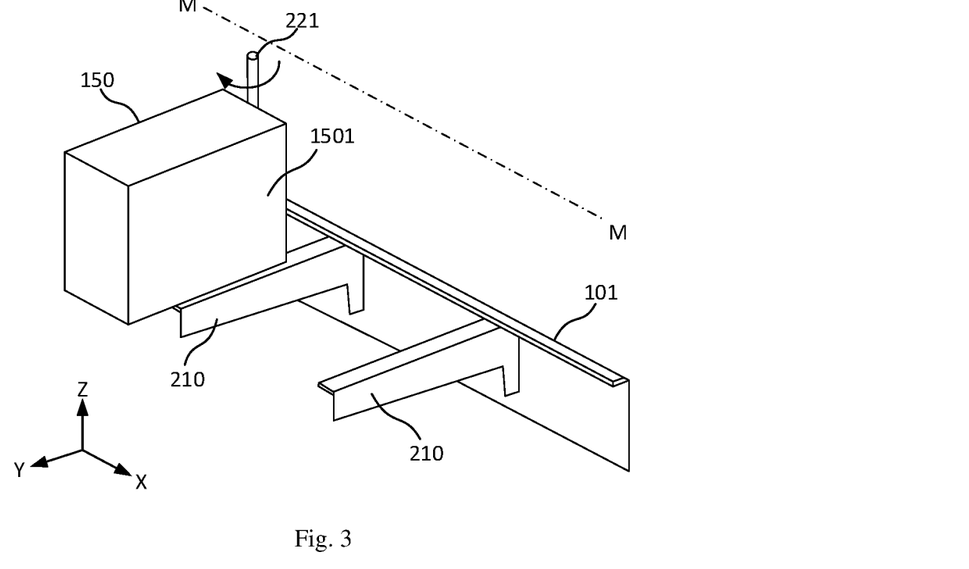
FIG. 3 illustrates a schematic diagram of the control box located at a second position according to at least one embodiment of the present disclosure.

FIG. 3 illustrates a schematic diagram of the control box located at the second position according to at least one embodiment of the present disclosure.

As illustrated in FIG. 3, in one example, the box connection mechanism can be configured to drive the control box 150 to move at least between the first position and the second position. For example, the box connection mechanism can include a rotation shaft 221. The rotation shaft 221 can be rotatably connected with the fixation rack 210, and the rotation shaft 221 can be located on a side of the control box 150 and is fixedly connected with the control box 150. The rotation shaft 221 can be rotated along with the control box 15 from the first position as illustrated in FIG. 2 to the second position as illustrated in FIG. 3, around an axis Z.

For example, the control box 150 has a first surface 1501 (that is, a back face of the control box 150 as illustrated in FIGS. 1 and 2). In a case that the control box is located at the first position, the first surface 1501 faces the transmission component, and the first surface 1501 is parallel with the axis M-M of the transmission shaft. That is, an included angle between the first surface and the axis M-M of the transmission shaft is substantially 0 degree. As illustrated in FIGS. 2 and 3, during the control box 150 being moved from the first position to the second position, the included angle between the first surface 1501 and the axis M-M of the transmission shaft increases gradually. When the control box 150 is moved to the second position, the included angle between the first surface and the axis M-M of the transmission shaft is 90 degrees, for example. In this way, when the fracturing apparatus is in a normal operation, the control box 150 can be located at the first position, so that the respective parts of the fracturing apparatus can be more compact. When the transmission component is required to be maintained, the control box 150 can be rotated to the second position, so that an open can be formed on a side of the transmission component and a region is empty as an operation space, which is convenient for an operator to maintain the transmission component. When the maintenance operation to the transmission component is completed, the control box 150 can be moved back to the first position.

Figure 4:
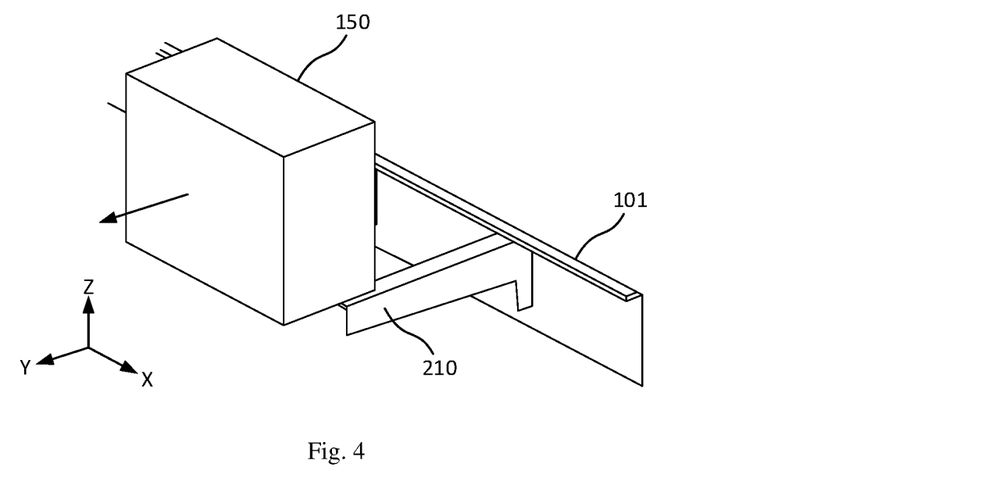
FIG. 4 illustrates another schematic diagram of the control box located at the second position according to at least one embodiment of the present disclosure.

FIG. 4 illustrates another schematic diagram of the control box located at the second position according to at least one embodiment of the present disclosure.

As illustrated in FIG. 4, in another example, the box connection mechanism can be configured to drive the control box 150 to move between the first position and the second position. For example, the box body connection structure can include a slide rail and a slide block (not illustrated). One of the slide rail and the slide block can be provided on a bottom of the control box 150, and the other one of the slide rail and the slide block can be provided on the fixation rack 210. The control box 150 can be moved forward and backward relative to the fixation rack 210, i.e. in the direction Y, under the cooperation of the slide rail and the slide block.

For example, as discussed above, the control box 150 has a first surface 1501 (that is, a back face of the control box 150 as illustrated in FIGS. 1 and 2). In a case that the control box 150 is located at the first position, the first surface 1501 faces the transmission component, and the first surface 1501 has a first vertical distance from the axis M-M of the transmission shaft. The first vertical distance is less than the above predetermined distance. During the control box being moved from the first position as illustrated in FIG. 2 to the second position as illustrated in FIG. 4, the vertical distance of the first surface 1501 from the axis M-M of the transmission shaft increases gradually. For example, when the control box is moved to the second position, the first vertical distance of the first surface from the axis M-M of the transmission shaft increases to a second vertical distance. The second vertical distance can be larger than the predetermined distance. The second vertical distance can be determined under actual requirements which is not limited by embodiments of the disclosure. In this way, when the fracturing apparatus is in a normal operation, the control box 150 can be located at the first position, so that the respective parts of the fracturing apparatus can be more compact. In a case that the transmission component is required to be maintained, the control box 150 can be moved forward to the second position, so that the distance between the control box 150 and the transmission component increases and a region is empty as an operation space in the direction Y of the transmission component, which is convenient for an operator to maintain the transmission component. When the maintenance operation to the transmission component is completed, the control box 150 can be moved back to the first position.

Hereinafter, an example in which the box connection mechanism drives the control box 150 to rotate is illustrated for further explanation.

Figure 5:
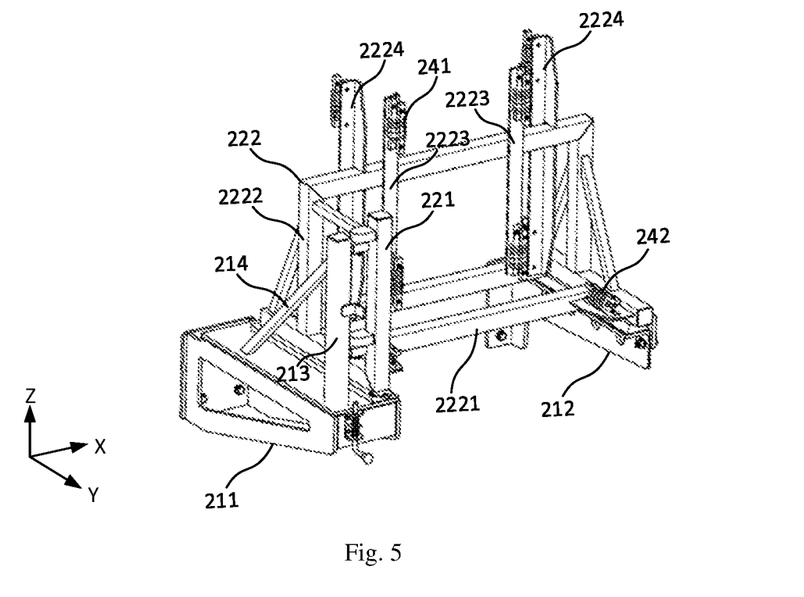
FIG. 5 illustrates a schematic diagram of a fixation rack and a box connection mechanism according to at least one embodiment of the present disclosure.

FIG. 5 illustrates a schematic diagram of a fixation rack and a box connection mechanism according to at least one embodiment of the present disclosure.

As illustrated in FIG. 5, the fixation rack includes a first fixation bracket 211, a second fixation bracket 212 and a fixation shaft 213.

For example, each of the first fixation bracket 211 and the second fixation bracket 212 is configured to be connected with the mounting base at its first end and have a second end extending in a first direction relative to the first end. For example, the second end extending in the first direction relative to the first end can be understood as a connection line of the second end and the first end extending in the first direction. That is, the connection line of the second end and the first end is parallel with the first direction. In FIG. 5, each of the first fixation bracket 211 and the second fixation bracket 212 has its back end be fixedly connected with the mounting base of the fracturing apparatus, and extends forwards from the back end in the direction Y.

For example, a first end of the fixation shaft 213 is fixedly connected with the first fixation bracket 211. A second end of the fixation shaft 213 extends in a second direction relative to the first end of the fixation shaft (a connection line of the second end of the fixation shaft 2133 and the first end of the fixation shaft 2133 is parallel with the second direction). The fixation shaft 213 is rotatably connected with the box connection mechanism. For example, as illustrated in FIG. 5, a bottom end of the fixation shaft 213 is fixed with the first fixation bracket 211 together, and a top end of the fixation shaft 213 extends upwards in a direction Z.

For example, in a case that the connection device is connected with the mounting base, any two of the first direction (i.e. the direction Y), the second direction (i.e. the direction Z) and an axis of the transmission shaft (i.e. the direction X) are perpendicular to each other.

For example, the fixation rack can include a support rod 214. The support rod 214 is inclinedly connected between the first fixation bracket 211 and the fixation shaft 213, to form a fixation structure in a shape of triangular with the first fixation bracket 211 and the fixation shaft 213.

For example, the box connection mechanism can include a support frame 222 and a rotation shaft 221.

For example, the support frame 222 includes a bottom frame 2221 and a vertical frame 2222 fixedly connected with the bottom frame 2221. A plane where the bottom frame 2221 is located is parallel with a plane formed by the first direction and the axis of the rotation shaft (i.e. the plane XY). In a case that the box connection mechanism is located at the first position, two sides of the bottom frame 2221 lap on the first fixation bracket 211 and the second fixation bracket 212, respectively. The vertical frame 2222 is located at a side of the bottom frame 2221 away from the first fixation rack and the second fixation rack. For example, the vertical frame 2222 is arranged vertically at a side of the bottom frame 2221 in the second direction. The vertical frame 222 is configured to be connected with the control box.

For example, the bottom frame 2221 includes two longitudinal rods and two transverse rods. The two longitudinal rods are arranged in the direction X and extend in the direction Y. The two transverse rods are arranged in the direction Y and extend in the direction X. The two transverse rods are located between the two longitudinal rods. The two transverse rods and the two longitudinal rods form a structure having a shape of "II". In a case that the box connection mechanism is located at the first position, the two longitudinal rods can lap on the first fixation bracket 211 and the second fixation bracket 212, respectively.

For example, the vertical frame 222 includes two vertical beams connected with two sides of the bottom frame respectively and a transverse beam connected between the two vertical beams. For example, the two vertical beams are arranged in the direction X and extend in the direction Z. Bottom ends of the two vertical rods are connected with the two longitudinal rods of the bottom frame 2221, respectively; two ends of the transverse rod are connected with top ends of the two vertical beams, respectively; and the two vertical beams and the transverse beam form a structure having a shape of gate arranged above the bottom frame 2221.

For example, the support frame 222 further includes a first vertical rod 2223 and a second vertical rod 2224 connected with both sides of the vertical frame, respectively. The first vertical rod 2223 and the second vertical rod 2224 can be connected with two sides of the transverse beam, respectively. Both of the first vertical rod 2223 and the second vertical rod 2224 extend in the second direction. The support frame 222 can include one or more first vertical rods 2223 and one or more second vertical rods 2224. The one or more first vertical rods 2223 are arranged on one side of the transverse beam, and the one or more second vertical rods 2224 are arranged on the other side of the transverse beam.

For example, a first end of the rotation shaft 221 is fixedly connected with the support frame 222, a second end of the rotation shaft 221 extends in the second direction relative to the first end of the rotation shaft 221 (a connection line of the second end of the rotation shaft 221 and the first end of the rotation shaft 221 is parallel with the second direction), and the rotation shaft 221 is rotatably connected with the fixation shaft 213. For example, the bottom end of the rotation shaft 221 is connected with a longitudinal rod of the bottom frame 2221, and the top end of the rotation shaft 221 extends upward in the direction Z, so that the rotation shaft 221 is arranged vertically above the bottom frame 2221. The rotation shaft 221 is rotatably connected with the fixation shaft 213, for example, by a hinge etc., so that the rotation shaft 221 can rotate around the fixation shaft 213.

Figure 6:
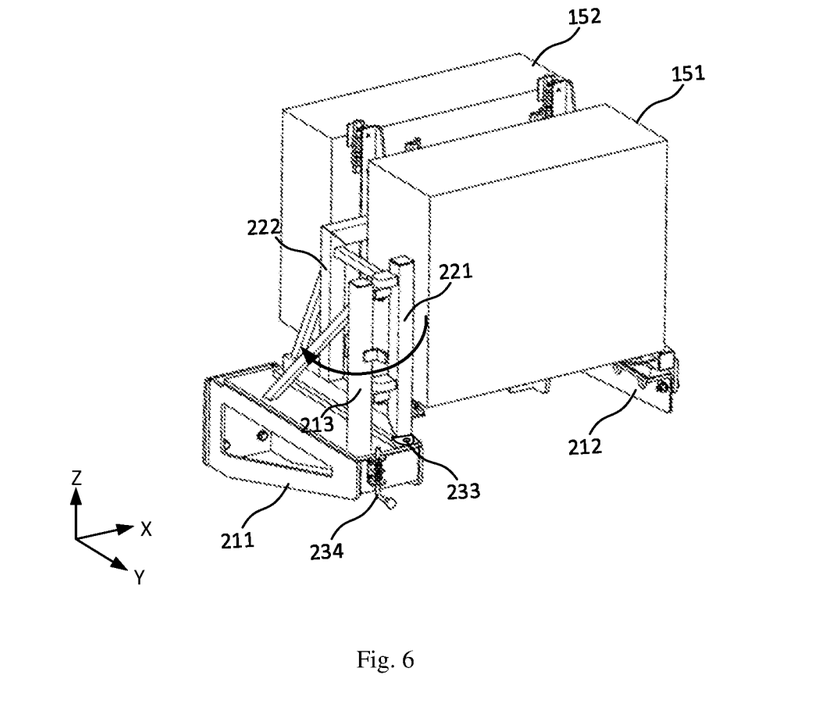
FIG. 6 illustrates a prospective schematic diagram of a control box and a connecting apparatus from a first angle of view according to at least one embodiment of the present disclosure.
Figure 7:
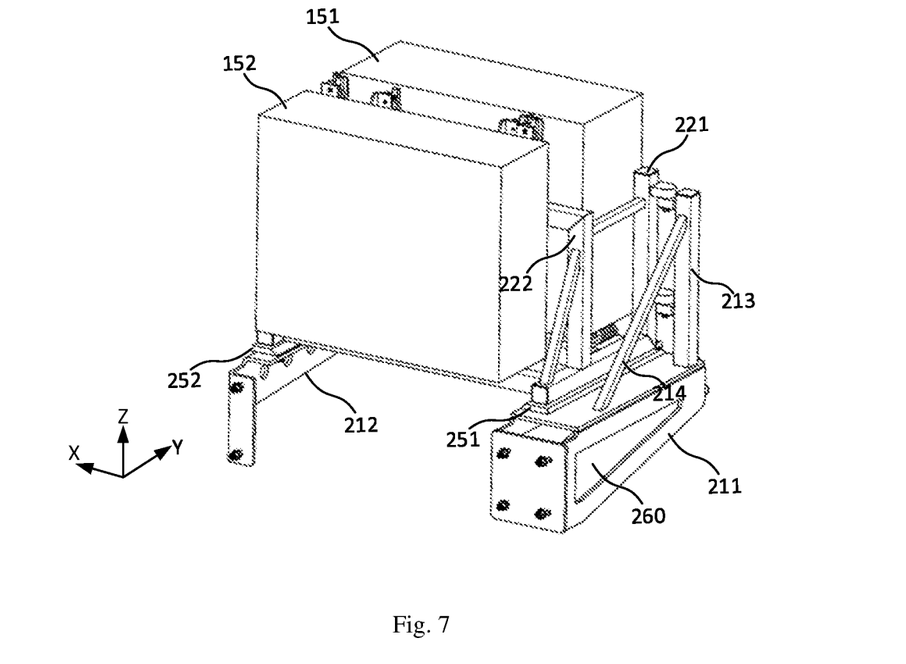
FIG. 7 illustrates a prospective schematic diagram of the control box and the connection device from a second view of angle according to at least one embodiment of the present disclosure.
Figure 8:
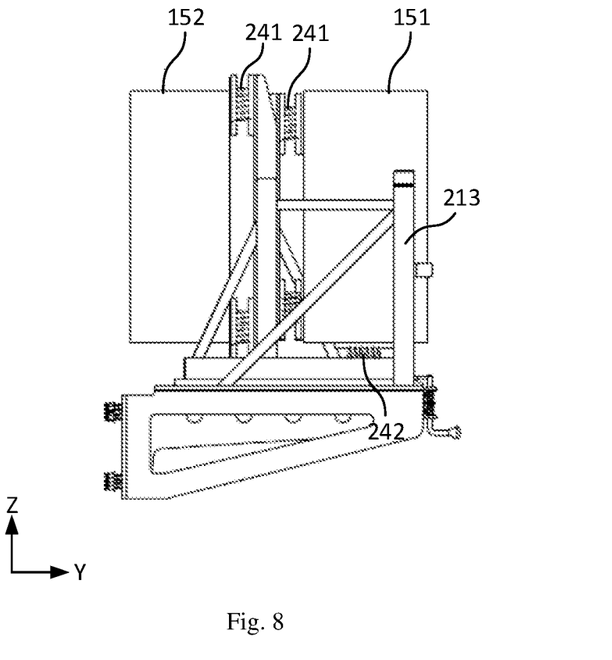
FIG. 8 illustrates a schematic side view of the control box and the connection device according to at least one embodiment of the present disclosure.
Figure 9:
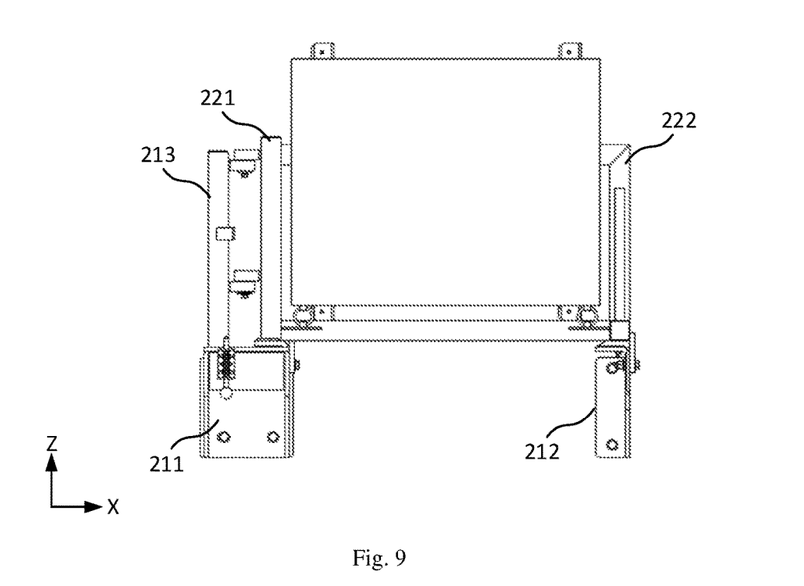
FIG. 9 illustrates a schematic front view of the control box and the connection device according to at least one embodiment of the present disclosure.

FIG. 6 illustrates a prospective schematic diagram of the control box and the connection device from a first angle of view according to at least one embodiment of the present disclosure. FIG. 7 illustrates a prospective schematic diagram of the control box and the connection device from a second view of angle according to at least one embodiment of the present disclosure. FIG. 8 illustrates a schematic side view of the control box and the connection device according to at least one embodiment of the present disclosure. FIG. 9 illustrates a schematic front view of the control box and the connection device according to at least one embodiment of the present disclosure.

As illustrated in FIGS. 5 to 9, for example, the control box includes a first control box 151 and a second control box 152. The first control box 151 and the second control box 152 are connected with both sides of the vertical frame 2222, respectively. The first vertical rod 2223 is configured to connect with the first control box 151, and the second vertical rod 2224 is configured to connect with the second control box 152. In the states as illustrated in FIGS. 6 to 9, the control box is located at the first position.

Figure 10:
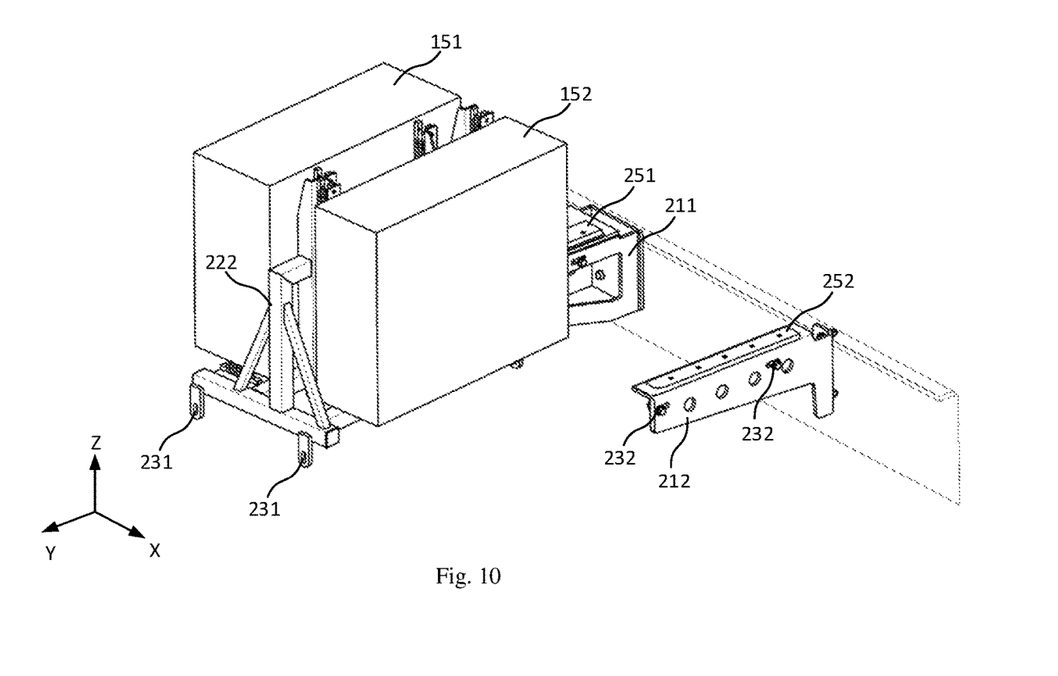
FIG. 10 illustrates a schematic diagram of the control box rotated to the second position according to at least one embodiment of the present disclosure.

FIG. 10 illustrates a schematic diagram of the control box rotated to the second position according to at least one embodiment of the present disclosure.

As illustrated in FIG. 10, under the rotation cooperation of the fixation shaft 213 and the rotation shaft 221, the box connection mechanism can rotate around the rotation shaft 221. Since the control box is connected with the box connection mechanism, the box connection mechanism can drive the control box to rotate around the rotation shaft 221 together, so that the control box is rotated along the arrow from the first position of the control box as illustrated in FIG. 6 to the second position of the control box as illustrated in FIG. 10 to form an operation space at the original first position.

For example, the fixation shaft 213 is located at the second end of the first fixation bracket 211. As illustrated in FIGS. 5 and 6, the fixation shaft 213 is located at the front end of the first fixation bracket 211. Based on this arrangement, the control box can have a forward movement tendency during the rotation process, that is, the control box rotates towards a lateral and forward direction, which can avoid interference between the control box and other mechanisms located on the side of the first fixation bracket 211.

For example, as illustrated in FIG. 10, the connection device further includes a first limitation component. The first limitation component includes a first limitation structure 231 and a second limitation structure 232. The first limitation structure 231 is disposed on the support frame, and the second limitation structure 232 is disposed on the second fixation bracket 212. For example, a connection piece is disposed on the bottom frame of the support frame, and the first limitation structure 231 can be a first through hole provided in the connection piece. The second limitation structure 232 can be a second through hole provided in the second fixation bracket 212. The first limitation component can further include a pin that matches the first through hole and the second through hole in size.

Figure 11:
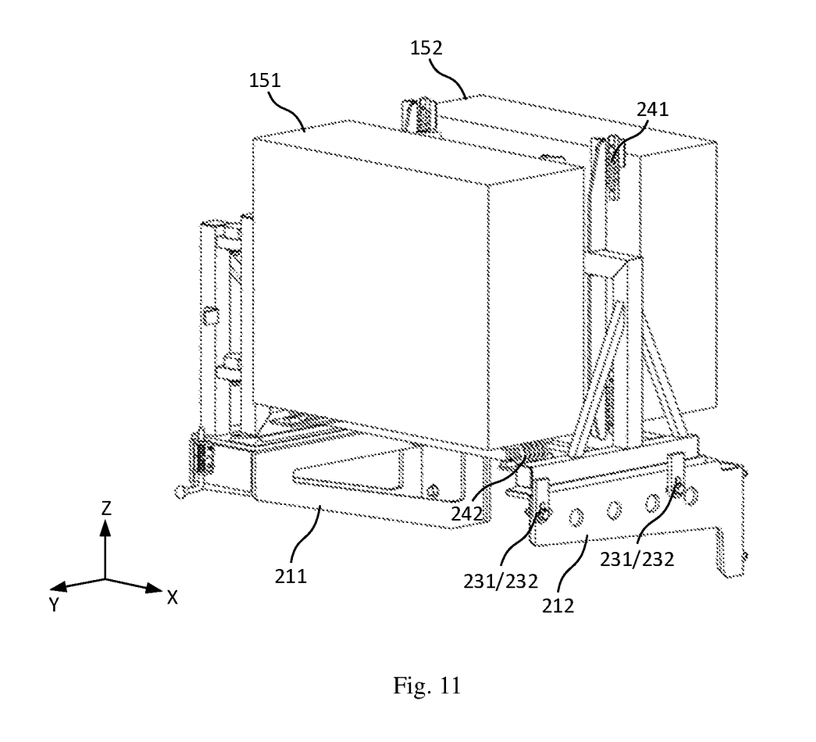
FIG. 11 illustrates a schematic diagram of the control box rotated back to the first position according to at least one embodiment of the present disclosure.

FIG. 11 illustrates a schematic diagram of the control box rotated back to the first position according to at least one embodiment of the present disclosure.

As illustrated in FIG. 11, in a case that the control box is located at the first position, the first limitation structure and the second limitation structure cooperate with each other to lock the control box at the first position. For example, in a case that the control box is located at the first position, the first through hole is aligned with the second through hole, and the pin can be plugged into the aligned first through hole and second through hole to prevent the box connection mechanism from moving, to further prevent the control box from moving and lock the control box at the first position.

For example, as illustrated in FIG. 6, the connection device further includes a second limitation component. The second limitation component includes a third limitation structure 233 and a fourth limitation structure 234. The third limitation structure 233 is disposed on the support frame 222. The fourth limitation structure 234 is disposed on the first fixation bracket 211. The third limitation structure 233 and the fourth limitation structure 234 cooperate with each other to lock the control box at the second position. For example, the third limitation structure 233 can be a third through hole provided in the bottom frame of the support frame 222, and the fourth limitation structure 234 can be a pin 234 provided on the first fixation bracket 211. After the box control mechanism drives the control box to rotate to the second position, the third through hole is aligned with the pin 234, and the pin 234 can be inserted into the third through hole to prevent the box connection mechanism from moving, prevent the control box from moving and lock the control box at the second position.

For example, as illustrated in FIGS. 5, 8 and 11, the connection device further includes at least one shock absorber, and the at least one shock absorber is configured to be connected between the support frame and the control box. The at least one shock absorber includes a first shock absorber 241 and a second shock absorber 242. The first shock absorber 241 is configured to be connected between the first vertical rod 2223 and the first control box 151 and/or connected between the second vertical rod 2224 and the second control box 152. For example, at least one first shock absorber 241 is provided between the first control box 151 and each first vertical rod 2223, and at least one first shock absorber 241 is also provided between the second control box 152 and each second vertical rod 2224. The first shock absorber 241 can buffer an impact force, thereby reducing the shock of the first control box 151 and the second control box 152.

For example, the second shock absorber 242 is configured to be connected between the bottom frame and the control box. At least one second shock absorber 242 can be provided at both the bottom of the first control box 151 and the bottom of the second control box 152 to further reduce the shock of the first control box 151 and the second control box 152.

For example, the shock absorber includes a vibration isolator. The first shock absorber 241 and the second shock absorber 242 can be implemented as spring vibration isolators or rubber vibration isolators.

For example, as illustrated in FIGS. 7 and 10, the surface (for example, the upper surface) of the first fixation bracket 211 towards the second direction (the direction Z) is provided with a first pad plate 251, and the first pad plate 251 is configured to be lapped with the bottom frame of the support frame 222. For example, in a case that the control box is located at the first position, the bottom frame of the support frame 222 can lap on the first pad plate 251. The first pad plate 251 extends in the first direction (the direction Y). A thickness of a side of the first pad plate 251 facing the second fixation bracket 212 is less than a thickness of a side of the first pad plate 251 away from the second fixation bracket 212, to form a first inclined surface on the first pad plate 251. In the view of angle as illustrated in FIG. 10, a thickness of the left side of the first pad plate 251 is larger than a thickness of the right side of the first pad plate 251, to form an inclined surface with a high left side and a low right side.

For example, as illustrated in FIGS. 7 and 10, the surface (for example, the upper surface) of the second fixation bracket 212 towards the second direction is provided with a second pad plate 252, and the second pad plate 252 is configured to be lapped with the bottom frame of the support frame 222. For example, in a case that the control box is located at the first position, the bottom frame of the support frame 222 can lap on the second pad plate 252. The second pad plate 252 extends in the first direction (the direction Y), and a thickness of a side of the second pad plate 252 close to the first end (for example, the rear end) of the second fixation bracket is larger than a thickness of a side of the second pad plate 252 close to a second end (for example, the front end) of the second fixation bracket, to form a second inclined surface on the second pad plate. For example, in the view of angle as illustrated in FIG. 10, a thickness of the front end of the second pad plate 252 is less than a thickness of the rear end of the second pad plate, to form an inclined surface with a low front and a high rear.

For example, in a case that the control box is located at the second position, due to the gravity, a side of the box connection mechanism away from the rotation shaft 213 would sink to a certain extent. During the control box being rotated from the second position back to the first position, the first inclined surface on the first pack plate 251 and the second inclined surface on the second pad plate 252 facilitate the box connection mechanism to smoothly rotate back to the first position.

For example, as illustrated in FIG. 7, the first fixation bracket 211 is provided with a via hole 260 running through the first fixation bracket 211 in the direction of the axis of the transmission shaft (the direction X), for a cable passing through the via hole to connect with the control box.

Another embodiment of the present disclosure further provides a control box component. The control box component includes a control box and the connection device of any one of the foregoing embodiments. In a state of the fracturing apparatus in a normal operation, the control box component can make the control box to locate at the first position, so that respective parts of the fracturing apparatus are more compact. In a case that the transmission component is required to be maintained, the control box can be moved to the second position, so that a region is empty as an operation space at a side of the transmission component, which is convenient for an operator to maintain the transmission component in the operation space.

Another embodiment of the present disclosure further provides a fracturing apparatus, including a mounting base, a transmission component, a control box, and the connection device of any of the foregoing embodiments.

For example, the fracturing apparatus can be as illustrated in FIG. 1. The transmission component includes a transmission shaft 130 and a transmission shaft mask. The control box 150 is connected with the mounting base (not illustrated in FIG. 1) by the connection device. In addition, the fracturing apparatus can further include a bottom skid 160, an exhaust muffler 171, a muffler cabin 172, an air intake cabin 180, a radiator 190 and other devices.

For example, in a state of the fracturing apparatus in a normal operation, the control box is located at the first position, so that the respective parts of the fracturing apparatus are more compact. In a case that the transmission component is required to be maintained, the control box can be moved to the second position, so that a region is empty as an operation space at a side of the transmission component, which is convenient for an operator to maintain the transmission component in the operation space.

The following statements should be noted:
(1) The accompanying drawings related to the embodiments of the present disclosure involve only the structures in connection with the embodiments of the present disclosure, and other structures can be referred to common designs.
(2) In case of no conflict, features in one embodiment or in different embodiments of the present disclosure can be combined to obtain new embodiments.

The foregoing are merely exemplary embodiments of the disclosure, but is not used to limit the protection scope of the disclosure. The protection scope of the disclosure shall be defined by the attached claims.

What is claimed is:

1. A connection device, for connecting a control box of a fracturing apparatus with a mounting base of the fracturing apparatus, the fracturing apparatus further comprising a transmission component, the transmission component comprising a transmission shaft, wherein the connection device comprises:
a fixation rack, configured to be fixedly connected with the mounting base;
a box connection mechanism, configured to be connected with the control box, and drive the control box to move at least from a first position to a second position relative to the fixation rack;
wherein, when the connection device is connected with the mounting base and the control box is located at the first position, the control box is located at a side of the transmission component in a direction perpendicular to an axis of the transmission shaft and a distance between the control box and the transmission component is less than a predetermined distance, and during the control box being moved from the first position to the second position, the control box is away from the transmission component to form an operation space for the transmission component at the first position.

2. The connection device of claim 1, wherein the box connection mechanism is configured to drive the control box to rotate at least between the first position and the second position;
the control box has a first surface, and in a case that the control box is located at the first position, the first surface faces the transmission component,
during the control box being moved from the first position to the second position, an included angle between the first surface and the axis of the transmission shaft increases gradually.

3. The connection device of claim 1, wherein the box connection mechanism is configured to drive the control box to move at least between the first position and the second position;
the control box has a first surface, and in a case that the control box is located at the first position, the first surface faces the transmission component,
during the control box being moved from the first position to the second position, a distance between the first surface and the axis of the transmission shaft increases gradually.

4. The connection device of claim 2, wherein the fixation rack comprises:
a first fixation bracket and a second fixation bracket, each of which is configured to have a first end fixedly connected with the mounting base and a second end extending in a first direction relative to the first end; and
a fixation shaft, configured to have a first end fixedly connected with the first fixation bracket and a second end extending in a second direction relative to the first end, and the fixation shaft is rotatably connected with the box connection mechanism,
wherein, in a case that the connection device is connected with the mounting base, any two of the first direction, the second direction and the axis of the transmission shaft are perpendicular to each other.

5. The connection device of claim 4, wherein the box connection mechanism comprises:
a support frame, comprising a bottom frame and a vertical frame fixedly connected with the bottom frame, wherein a plane where the bottom frame is located is parallel with a plane formed by the first direction and the axis of the transmission shaft; in a case that the box connection mechanism is located at the first position, two sides of the bottom frame lap on the first fixation bracket and the second fixation bracket, respectively; the vertical frame is located at a side of the bottom frame away from the first fixation bracket and the second fixation bracket, and the vertical frame is configured to be connected with the control box, and a rotation shaft, configured to have a first end fixedly connected with the support frame and a second end extending to the second direction relative to the first end, and the rotation shaft being rotatably connected with the fixation shaft.

6. The connection device of claim 5, wherein the control box comprises a first control box and a second control box, and the first control box and the second control box are connected with two sides of the vertical frame, respectively, the support frame further comprises a first vertical rod and a second vertical rod connected with the two sides of the vertical frame, the first vertical rod is configured to be connected with the first control box, and the second vertical rod is configured to be connected with the second control box.

7. The connection device of claim 5, wherein the fixation shaft is located at the second end of the first fixation bracket.

8. The connection device of claim 5, further comprising:
a first limitation component, comprising a first limitation structure and a second limitation structure, wherein the first limitation structure is disposed on the support frame, the second limitation structure is disposed on the second fixation bracket, the first limitation structure and the second limitation structure cooperate with each other to lock the control box at the first position.

9. The connection device of claim 5, further comprising:
A first limitation component, comprising a first limitation structure and a second limitation structure, wherein the first limitation structure is disposed on the support frame, the second limitation structure is disposed on the first fixation bracket, the first limitation structure and the second limitation structure cooperate with each other to lock the control box at the second position.

10. The connection device of claim 6, further comprising:
at least one shock absorber, configured to be connected between the support frame and the control box,
wherein the at least one shock absorber comprises a first shock absorber and a second shock absorber, the first shock absorber is configured to be connected between the first vertical rod and the first control box and/or between the second vertical rod and the second control box, and the second shock absorber is configured to be connected between the bottom frame and the control box,
wherein the shock absorber comprises a vibration isolator.

11. The connection device of claim 5, wherein a surface of the first fixation bracket towards the second direction is provided with a first pad plate, the first pad plate is configured to be lapped with the support frame, the first pad plate extends in the first direction, a thickness of a side of the first pad plate facing the second fixation bracket is less than a thickness of a side of the first pad plate away from the second fixation bracket, to form a first inclined surface on the first pad plate.

12. The connection device of claim 11, wherein a surface of the second fixation bracket towards the second direction is provided with a second pad plate, the second pad plate is configured to be lapped with the support frame, the second pad plate extends in the first direction, a thickness of a side of the first pad plate close to the first end of the second fixation bracket is larger than a thickness of a side of the second pad plate close to the second end of the second fixation bracket, to form a second inclined surface on the second pad plate.

13. The connection device of claim 5, wherein the first fixation bracket is provided with a via hole running through the first fixation bracket in a direction of the axis of the transmission shaft, for a cable running through the via hole to be connected with the control box.

14. A control box component, comprising:
a control box; and
the connection device of claim 1,
wherein the control box is connected to the connection device.

15. The control box component of claim 14, wherein the fixation rack comprises:
a first fixation bracket and a second fixation bracket, each of which is configured to have a first end fixedly connected with the mounting base and a second end extending in a first direction relative to the first end; and
a fixation shaft, configured to have a first end fixedly connected with the first fixation bracket and a second end extending in a second direction relative to the first end, and the fixation shaft is rotatably connected with the box connection mechanism,
wherein, in a case that the connection device is connected with the mounting base, any two of the first direction, the second direction and the axis of the transmission shaft are perpendicular to each other.

16. The control box component of claim 15, wherein the box connection mechanism comprises:
a support frame, comprising a bottom frame and a vertical frame fixedly connected with the bottom frame, wherein a plane where the bottom frame is located is parallel with a plane formed by the first direction and the axis of the transmission shaft; in a case that the box connection mechanism is located at the first position, two sides of the bottom frame lap on the first fixation bracket and the second fixation bracket, respectively; the vertical frame is located at a side of the bottom frame away from the first fixation bracket and the second fixation bracket, and the vertical frame is configured to be connected with the control box, and
a rotation shaft, configured to have a first end fixedly connected with the support frame and a second end extending to the second direction relative to the first end, and the rotation shaft being rotatably connected with the fixation shaft.

17. The control box component of claim 16, wherein the control box comprises a first control box and a second control box, and the first control box and the second control box are connected with two sides of the vertical frame, respectively,
the support frame further comprises a first vertical rod and a second vertical rod connected with the two sides of the vertical frame, the first vertical rod is configured to be connected with the first control box, and the second vertical rod is configured to be connected with the second control box.

18. A fracturing apparatus, comprising:
a mounting base,
a transmission component,
a control box, and
the connection device of claim 1,
wherein the control box is connected to the mounting base through the connection device.

19. The fracturing apparatus of claim 18, wherein the box connection mechanism is configured to drive the control box to rotate at least between the first position and the second position;
the control box has a first surface, and in a case that the control box is located at the first position, the first surface faces the transmission component, during the control box being moved from the first position to the second position, an included angle between the first surface and the axis of the transmission shaft increases gradually.

20. The fracturing apparatus of claim 18, wherein the box connection mechanism is configured to drive the control box to move at least between the first position and the second position;

the control box has a first surface, and in a case that the control box is located at the first position, the first surface faces the transmission component, during the control box being moved from the first position to the second position, a distance between the first surface and the axis of the transmission shaft increases gradually.

* * * * *